US012604384B2

(12) United States Patent
Chen et al.

(10) Patent No.: US 12,604,384 B2
(45) Date of Patent: Apr. 14, 2026

(54) OLED PRINT HEAD

(71) Applicant: Avision Inc., Hsinchu (TW)

(72) Inventors: Yen-Cheng Chen, Hsinchu (TW); Chin-Hung Wang, Hsinchu (TW)

(73) Assignee: AVISION INC., Hsinchu (TW)

( * ) Notice: Subject to any disclaimer, the term of this patent is extended or adjusted under 35 U.S.C. 154(b) by 66 days.

(21) Appl. No.: 18/937,411

(22) Filed: Nov. 5, 2024

(65) Prior Publication Data

US 2025/0294655 A1 Sep. 18, 2025

(30) Foreign Application Priority Data

Mar. 18, 2024 (TW) ................................ 113110022

(51) Int. Cl.

*H05B 45/60* (2022.01)
*B41J 2/45* (2006.01)
*H05B 45/14* (2020.01)
*H05B 47/155* (2020.01)

(52) U.S. Cl.

CPC ................ *H05B 45/60* (2020.01); *B41J 2/45* (2013.01); *H05B 45/14* (2020.01); *H05B 47/155* (2020.01)

(58) Field of Classification Search

CPC .... B41J 2/45; B41J 2/47; H05B 45/14; H05B 45/60; H05B 47/155

See application file for complete search history.

(56) References Cited

U.S. PATENT DOCUMENTS 9,158,106 B2 * 10/2015 Hagood ............... G09G 3/3433

* cited by examiner

*Primary Examiner* — Monica C King

(74) *Attorney, Agent, or Firm* — McClure, Qualey & Rodack, LLP

(57) ABSTRACT

An OLED print head includes a control unit, multiple light-emitting units and an OLED. Each light-emitting unit includes a first driving circuit and a second driving circuit. The first driving circuit includes a first capacitor and a first switch, and is configured to store a correction voltage corresponding to a correction signal in the first capacitor in response to a trigger pulse of a scan signal, and the first switch is controlled by the correction voltage. The second driving circuit includes a second capacitor and a second switch, and is configured to store an enable voltage corresponding to an enable signal in the second capacitor in response to the trigger pulse of the scan signal, and the second switch is controlled by the enable voltage. When both the first switch and the second switch are turned on, the OLED obtains a driving current related to the correction voltage.

10 Claims, 7 Drawing Sheets

OLED PRINT HEAD

CROSS-REFERENCE TO RELATED APPLICATION

This non-provisional application claims priority under 35 U.S.C. § 119(a) to patent application Ser. No. 11/311,0022 filed in Taiwan, R.O.C. on Mar. 18, 2024, the entire contents of which are hereby incorporated by reference.

BACKGROUND

Technical Field

The present disclosure relates to an OLED print head, and in particular to an OLED print head having a light-emitting unit made of a thin film transistor and an OLED.

Related Art

An LED print head (LPH) is a light-emitting technology for print heads, which mainly uses a gallium arsenide semiconductor process to manufacture multiple light-emitting modules, each of which has multiple light-emitting elements and driving circuits thereof. Each light-emitting module is a die. The light-emitting modules are fixedly arranged on a printed circuit board by die bonding. Therefore, in order to manufacture the above-mentioned print head, complicated processes such as wafer dicing and die bonding are needed.

SUMMARY

In view of this, the present disclosure provides an OLED print head manufactured by an active-matrix organic light-emitting diode (AMOLED) process, including a control unit and multiple light-emitting units. The control unit is configured to output a scan signal, an enable signal and a correction signal. The multiple light-emitting units are coupled to the control unit. Each of the light-emitting units includes a first driving circuit, a second driving circuit and an OLED. The first driving circuit includes a first capacitor and a first switch, and is configured to store a correction voltage corresponding to the correction signal in the first capacitor in response to a trigger pulse of the scan signal, and the first switch is controlled by the correction voltage. The second driving circuit includes a second capacitor and a second switch, and is configured to store an enable voltage corresponding to the enable signal in the second capacitor in response to the trigger pulse of the scan signal, and the second switch is controlled by the enable voltage. The OLED is coupled to the first switch and the second switch. The first switch and the second switch are deployed on a driving path of the OLED. An upstream end of the driving path has an operating voltage. When both the first switch and the second switch are turned on, the OLED obtains a driving current related to the correction voltage through the driving path.

In some examples, the control unit further includes a scan signal generating circuit, an enable signal generating circuit and a correction signal generating circuit. The scan signal generating circuit includes multiple scan signal output terminals, and is configured to output the scan signal through the scan signal output terminals. The enable signal generating circuit includes multiple enable signal output terminals, and is configured to output the enable signal. The correction signal generating circuit includes multiple correction signal output terminals, and is configured to output the correction signal. The light-emitting units are divided into multiple groups, and each of the scan signal output terminals is coupled to the light-emitting units with a same ordinal number as the scan signal output terminal in the groups. The enable signal output terminals are respectively coupled to the groups one-to-one, and each of the enable signal output terminals is coupled to all the light-emitting units in the same group. The correction signal output terminals are respectively coupled to the groups one-to-one, and each of the correction signal output terminals is coupled to all the light-emitting units in the same group.

In some examples, the scan signal generating circuit includes multiple shift registers. Each of the shift registers includes a shift input terminal and a shift output terminal, and the shift registers are sequentially connected in series such that the shift output terminal of the previous-stage shift register is coupled to the shift input terminal of the later-stage shift register. The shift output terminals are respectively coupled to the corresponding light-emitting units one-to-one, such that the trigger pulse is respectively transmitted to the light-emitting units sequentially through the shift output terminals.

Based on the above, according to the OLED print head in some examples of the present disclosure, the light-emitting unit made of a conductive thin film transistor and the multiple OLEDs and the driving circuits thereof can be directly manufactured on a substrate, which can reduce the manufacturing steps. In addition, the first capacitor of the light-emitting unit stores the correction voltage corresponding to the correction signal, and will not discharge the voltage to a low potential, which can prevent severe fluctuations in charge/discharge voltage of the capacitor, shorten the light-emitting response time of the light-emitting unit (in response to the correction signal with a short cycle time, the light-emitting unit can be continuously lit and extinguished quickly) and protect the element from damage, thereby prolonging the service life and shortening the response time of the OLED.

The detailed features and advantages of the present disclosure are set forth in the detailed description of the implementation of the present disclosure, the content of which is sufficient for any person skilled in the art to understand the technical content of the present disclosure and implement it based thereon. According to the contents disclosed in this specification, claims and drawings, any person skilled in the art can easily understand the objects and advantages associated with the present disclosure.

DETAILED DESCRIPTION

Figure 1:
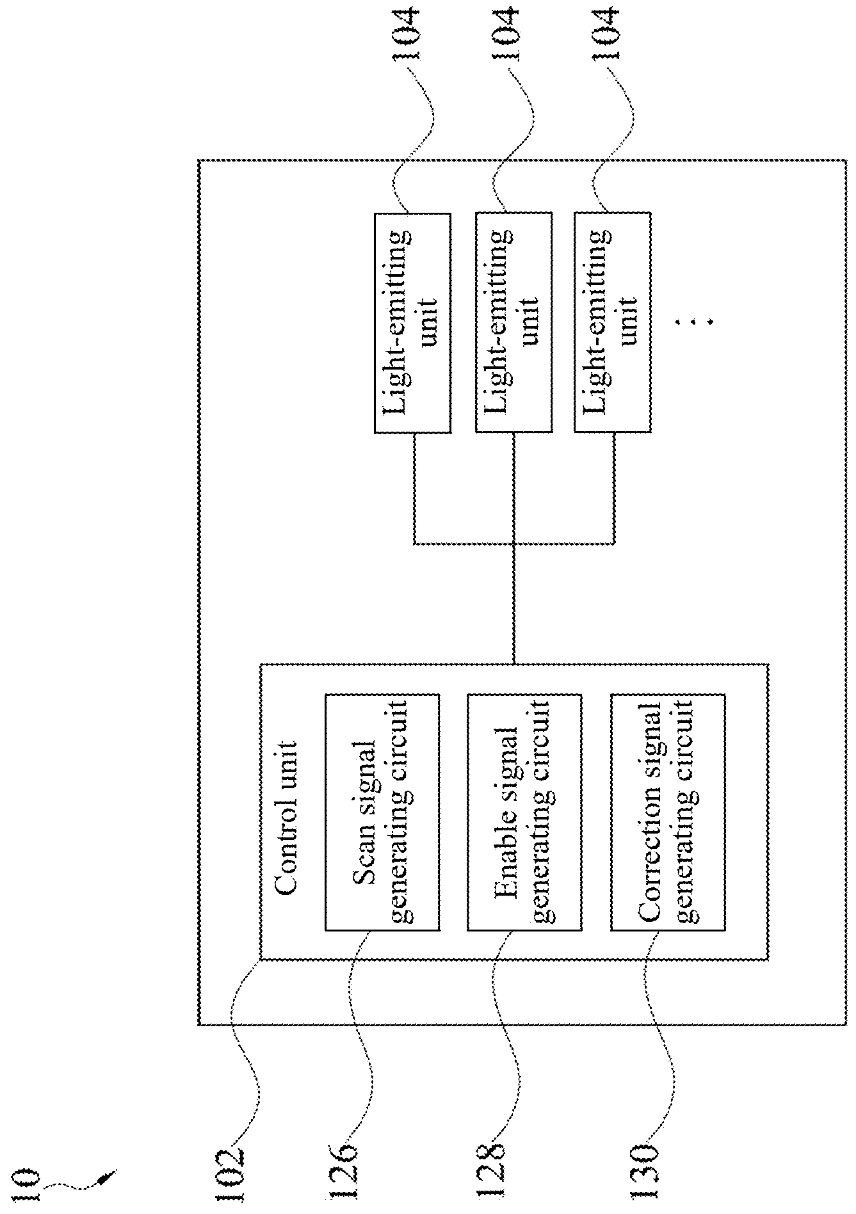
FIG. 1 is a schematic block diagram of an OLED print head in some examples of the present disclosure.

Referring to FIG. 1, FIG. 1 is a schematic block diagram of an OLED print head 10 in some examples of the present disclosure. The OLED print head 10 includes a control unit 102 and multiple light-emitting units 104. The light-emitting units 104 are coupled to the control unit 102. The light-emitting unit 104 includes a light-emitting element made by a conductive thin film technology and driving circuits thereof, so the light-emitting units 104 may be formed on a substrate (as shown by a substrate 150 in FIG. 9) according to a predetermined layout. The control unit 102 is configured to output a scan signal, an enable signal and a correction signal. Specifically, the control unit 102 includes a scan signal generating circuit 126, an enable signal generating circuit 128 and a correction signal generating circuit 130, which are respectively configured to output the scan signal, the enable signal and the correction signal. The scan signal is configured to designate the light-emitting unit 104 to be controlled. The correction signal determines a brightness of light emitted by the designated light-emitting unit 104. The enable signal determines whether or not the designated light-emitting unit 104 emits light.

Figure 2:
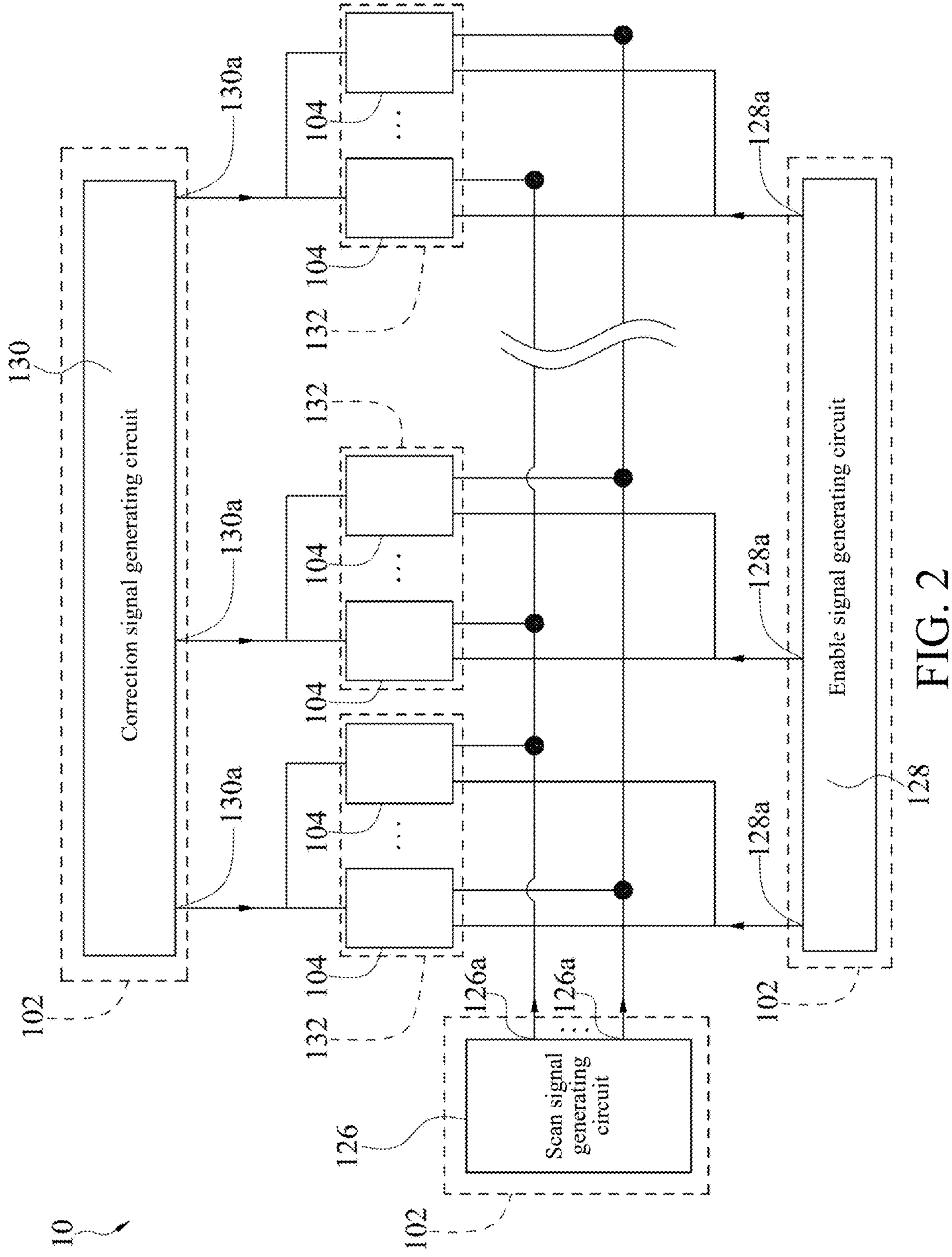
FIG. 2 is a feeder diagram of an OLED print head in some examples of the present disclosure.

Referring to FIG. 2, FIG. 2 is a feeder diagram of the OLED print head 10 in some examples of the present disclosure, which shows the connection relationship between the control unit 102 and the light-emitting units 104. The light-emitting units 104 are divided into multiple groups 132. Each of the groups 132 includes multiple light-emitting units 104. Each of the groups 132 includes the same number of light-emitting units 104. As an example, the number of the light-emitting units 104 is 128, but the present disclosure is not limited thereto. For example, the number may be 64, 256 or the like. The scan signal generating circuit 126 includes multiple scan signal output terminals 126*a*, and is configured to output the scan signal through the scan signal output terminals 126*a*. Each of the scan signal output terminals 126*a* is coupled to the light-emitting units 104 with a same ordinal number as the scan signal output terminal 126*a* in the groups 132. For example, the first light-emitting unit 104 in each of the groups 132 is coupled to the first scan signal output terminal 126*a*; the second light-emitting unit 104 in each of the groups 132 is coupled to the second scan signal output terminal 126*a*; and so on. Here, the ordinal numbers of the light-emitting units 104 in the groups 132 are not limited to starting from the same side. That is, the ordinal numbers may start from one side of the light-emitting units 104 or the other side of the light-emitting units 104. As shown in FIG. 2, the first scan signal output terminal 126*a* is coupled to the first light-emitting units 104 from the left side in some groups 132 and the first light-emitting units 104 from the right side in some groups.

Figure 5:
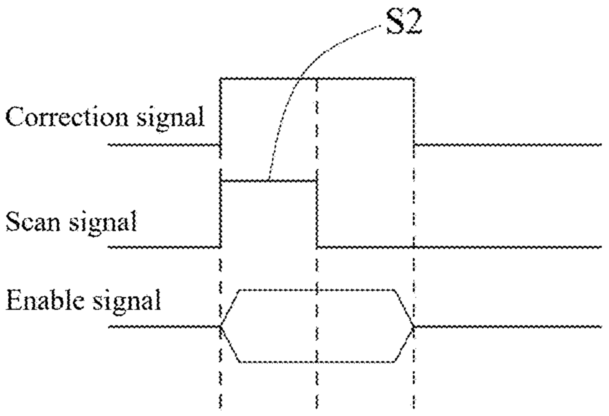
FIG. 5 is a signal timing diagram of an OLED print head in some examples of the present disclosure.

FIG. 5 is a signal timing diagram of the OLED print head 10 in some examples of the present disclosure. Here, the correction signal, the scan signal and the enable signal received by one light-emitting unit 104 are exemplarily shown. As shown in FIG. 5, the scan signal includes a trigger pulse S2, and is configured to indicate the light-emitting unit 104 to perform an action in response to the trigger pulse S2. The trigger pulse S2 is a square wave, which changes from a low potential to a high potential, holds for a period of time and returns to a low potential, but the present disclosure is not limited thereto. For example, according to design requirements, the trigger pulse S2 is a square wave which changes from a high potential to a low potential and then returns to a high potential in some examples.

Referring to FIG. 2 and FIG. 5, the scan signals outputted by the scan signal output terminals 126*a* each are different from each other (i.e., the time points of the trigger pulses S2 are different), so at each time point, only one scan signal output terminal 126*a* designates the light-emitting units 104 with the same ordinal number in the groups 132. For example, at the first time point, the first light-emitting units 104 in the groups 132 are designated to perform an action; at the next time point (second time point), the second light-emitting units 104 in the groups 132 are designated to perform an action; and so on.

As shown in FIG. 2, the enable signal generating circuit 128 includes multiple enable signal output terminals 128*a* and is configured to output the enable signal through the enable signal output terminals 128*a*. The enable signal output terminals 128*a* are respectively coupled to the groups 132 one-to-one, and each of the enable signal output terminals 128*a* is coupled to all the light-emitting units 104 in the same group 132. Therefore, all the light-emitting units 104 in the same group 132 receive the same enable signal. However, since only one light-emitting unit 104 in the same group 132 is designated (receives the trigger pulse S2) at one time point, only the designated light-emitting unit 104 performs the action corresponding to the enable signal, and the light-emitting units 104 that do not receive the trigger pulse S2 do not perform the action corresponding to the enable signal. Besides, the enable signals outputted by the enable signal output terminals 128*a* each are independent of each other without mutual influence, so the light-emitting unit 104 designated in each of the groups 132 can be individually controlled according to needs.

Similarly, the correction signal generating circuit 130 includes multiple correction signal output terminals 130*a* and is configured to output the correction signal through the correction signal output terminals 130*a*. The correction signal output terminals 130*a* are respectively coupled to the groups 132 one-to-one, and each of the correction signal output terminals 130*a* is coupled to all the light-emitting units 104 in the same group 132. Therefore, all the light-emitting units 104 in the same group 132 receive the same correction signal. However, since only one light-emitting unit 104 in the same group 132 is designated (receives the trigger pulse S2) at one time point, only the designated light-emitting unit 104 performs the action corresponding to the correction signal, and the light-emitting units 104 that do not receive the trigger pulse S2 do not perform the action corresponding to the correction signal. Besides, the correction signals outputted by the correction signal output terminals 130*a* each are independent of each other without mutual influence, so the light-emitting unit 104 designated in each of the groups 132 can be individually controlled according to needs.

In some examples, if the resolution of the OLED print head 10 is to reach 600 DPI (Dots Per Inch), about 5120 light-emitting units 104 are required. As described above, each of the groups 132 has 128 light-emitting units 104, so 40 groups 132 are required. In this case, the number of the scan signal output terminals 126*a* is 128, and the numbers of the enable signal output terminals 128*a* and the correction signal output terminals 130*a* are both 40. In addition, since the light-emitting units 104 in the same group 132 share the same enable signal output terminal 128*a* and the same correction signal output terminal 130*a*, the correction signal and the enable signal are both serialization data, and 128 signals are required to respectively indicate the actions to be performed by the corresponding 128 light-emitting units 104.

Figure 3:
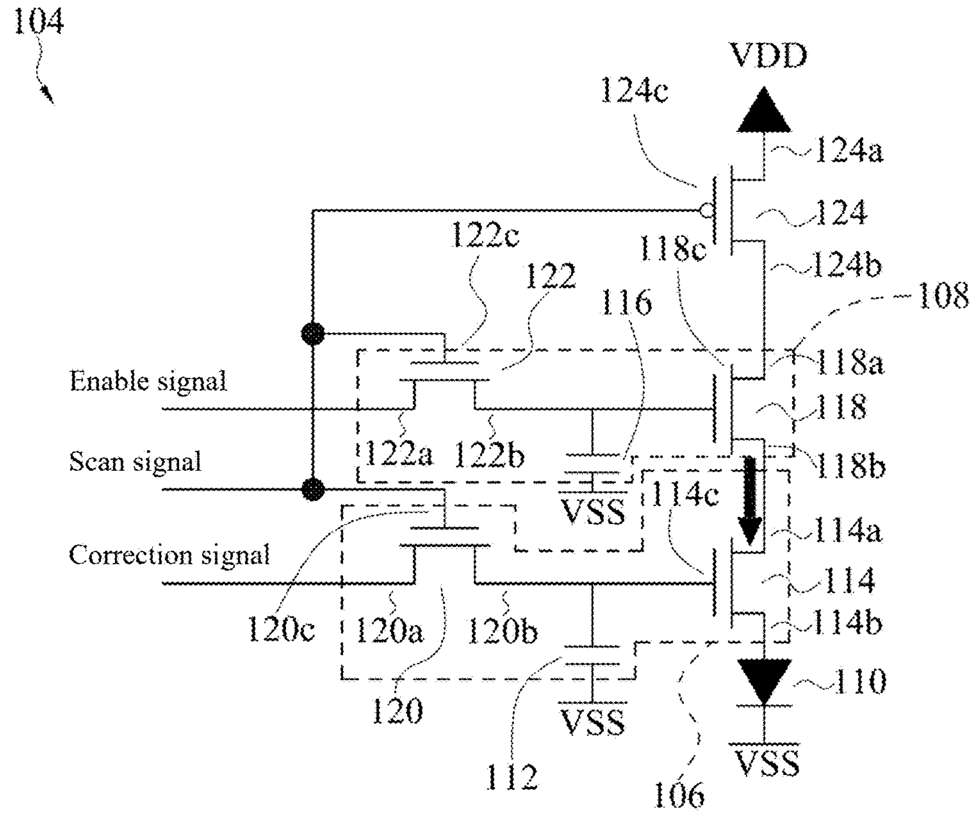
FIG. 3 is a circuit diagram of an embodiment of a light-emitting unit in some examples of the present disclosure.

Next, the specific composition of the light-emitting element and the driving circuits thereof inside the light-emitting unit 104 will be described. FIG. 3 is a circuit diagram of an embodiment of the light-emitting unit 104 in some examples of the present disclosure. As shown in FIG. 3, each of the light-emitting units 104 includes a first driving circuit 106, a second driving circuit 108 and an OLED 110. The first driving circuit 106 includes a first capacitor 112 and a first switch 114. The first driving circuit 106 receives the scan signal and the correction signal, and is configured to store a correction voltage corresponding to the correction signal in the first capacitor 112 in response to the trigger pulse S2 of the scan signal. The first switch 114 is coupled to the first capacitor 112 so as to be controlled by the correction voltage. The second driving circuit 108 includes a second capacitor 116 and a second switch 118. The second driving circuit 108 receives the scan signal and the enable signal, and is configured to store an enable voltage corresponding to the enable signal in the second capacitor 116 in response to the trigger pulse S2 of the scan signal. The second switch 118 is coupled to the second capacitor 116 so as to be controlled by the enable voltage. The OLED 110 is coupled to the first switch 114 and the second switch 118, and the first switch 114 and the second switch 118 are deployed on a driving path of the OLED 110. An upstream end of the driving path has an operating voltage VDD. When both the first switch 114 and the second switch 118 are turned on, the OLED 110 obtains a driving current related to the correction voltage through a driving path so as to emit light. Therefore, each OLED 110 may obtain a corrected driving current according to the correction voltage so as to emit light with the same brightness.

As shown in FIG. 3, the second switch 118, the first switch 114 and the OLED 110 are sequentially coupled along a flow direction of the driving current. Specifically, the first switch 114 includes a first terminal 114*a*, a second terminal 114*b* and a control terminal 114*c*. The second switch 118 includes a first terminal 118*a*, a second terminal 118*b* and a control terminal 118*c*. The second terminal 118*b* of the second switch 118 is coupled to the first terminal 114*a* of the first switch 114, the second terminal 114*b* of the first switch 114 is coupled to an anode of the OLED 110, and a cathode of the OLED 110 receives a ground voltage VSS. The control terminal 114*c* of the first switch 114 is coupled to the first capacitor 112 to receive the correction voltage of the first capacitor 112, so the on state of the first switch 114 is determined by the correction voltage. The control terminal 118*c* of the second switch 118 is coupled to the second capacitor 116 to receive the enable voltage of the second capacitor 116, so the on state of the second switch 118 is determined by the enable voltage. Here, the first switch 114 and the second switch 118 are NMOS transistors, with the first terminals (114*a*, 118*a*) as drains, the second terminals (114*b*, 118*b*) as sources and the control terminals (114*c*, 118*c*) as gates. In some examples, when the first switch 114 is an NMOS transistor, the correction voltage determines a voltage ($V_{GS}$) between the gate and the source of the first switch 114, and also determines a drain-source on state current. In some examples, the first switch 114 is called a driving switch, for example, a driving thin film transistor (driving TFT). The remaining switches (such as the second switch 118 and switches described later) are called switching switches, for example, switching thin film transistors (switching TFTs).

As shown in FIG. 3, the first driving circuit 106 further includes a third switch 120. The third switch 120 includes a first terminal 120*a*, a second terminal 120*b* and a control terminal 120*c*. The first terminal 120*a* of the third switch 120 receives the correction signal. The second terminal 120*b* of the third switch 120 is coupled to the first capacitor 112. The control terminal 120*c* of the third switch 120 receives the scan signal. Therefore, the on state of the third switch 120 is determined by the scan signal. Here, the third switch 120 is an NMOS transistor, with the first terminal 120*a* as a drain, the second terminal 120*b* as a source, and the control terminal 120*c* as a gate. Referring to FIG. 3 and FIG. 5, in response to the trigger pulse S2 of the scan signal, the third switch 120 is turned on, that is, the first terminal 120*a* of the third switch 120 and the second terminal 120*b* of the third switch 120 are turned on, so that the first capacitor 112 receives the correction signal through the third switch 120 and is charged to the correction voltage. The process error may cause the transistors and the OLED 110 in each of the light-emitting units 104 to have inconsistent characteristics, resulting in inconsistent brightness of light emitted by the OLEDs 110 of the light-emitting units 104. Therefore, a suitable correction voltage value is given to each corresponding light-emitting unit 104 through the correction signal so as to adjust the driving current given to the corresponding OLED 110, so that each OLED 110 emits light with the same brightness. It should be particularly noted that in FIG. 5, although the correction signal corresponding to the period of the trigger pulse S2 is at a high potential in terms of digital logic, the voltage level (i.e., voltage value) of the high potential may be slightly adjusted according to needs, so that the voltage between the gate and the source of the first switch 114 is greater than a threshold voltage such that the first switch 114 is turned on, and the drain-source current is adjusted by changing the value of the voltage between the gate and the source (if the brightness needs to be lowered, the correction voltage is lowered to reduce the drain-source current; otherwise, the correction voltage is increased).

As shown in FIG. 3, the second driving circuit 108 further includes a fourth switch 122, and the fourth switch 122 includes a first terminal 122*a*, a second terminal 122*b* and a control terminal 122*c*. The first terminal 122*a* of the fourth switch 122 receives the enable signal. The second terminal 122*b* of the fourth switch 122 is coupled to the second capacitor 116. The control terminal 122*c* of the fourth switch 122 receives the scan signal. Therefore, the on state of the fourth switch 122 is determined by the scan signal. Here, the fourth switch 122 is an NMOS transistor, with the first terminal 122*a* as a drain, the second terminal 122*b* as a source, and the control terminal 122*c* as a gate. Referring to FIG. 3 and FIG. 5, in response to the trigger pulse S2 of the scan signal, the fourth switch 122 is turned on, that is, the first terminal 122*a* of the fourth switch 122 and the second terminal 122*b* of the fourth switch 122 are turned on, so that the second capacitor 116 receives the enable signal through the fourth switch 122 and is charged to the enable voltage. When the enable signal is at a low potential, it is impossible to charge the second capacitor 116 to turn on the second switch 118, so the second switch 118 is in an off state. When the enable signal is at a high potential, the enable voltage of the second capacitor 116 allows the second switch 118 to be turned on. Therefore, the second switch 118 can be controlled to be on or off through the enable signal, thereby determining whether the OLED 110 can emit light. In other words, the correction voltage obtained by the first switch 114 can always allow the first switch 114 to be turned on, and whether the OLED 110 can obtain the driving current depends on whether the second switch 118 is turned on. When the second switch 118 is turned on (i.e., both the first switch 114 and the second switch 118 are turned on), the OLED 110 obtains the driving current so as to emit light. When the second switch 118 is turned off, the driving path of the OLED 110 is not turned on, and the OLED 110 does not emit light.

As described above, both the control terminal 120*c* of the third switch 120 and the control terminal 122*c* of the fourth switch 122 receive the scan signal, that is, the control terminal 120*c* of the third switch 120 and the control terminal 122*c* of the fourth switch 122 are coupled to each other. Therefore, the third switch 120 and the fourth switch 122 are turned on at the same time in response to the trigger pulse S2 of the scan signal, that is, the respective first terminals (120*a*, 122*a*) and the second terminals (120*b*, 122*b*) are turned on, so that the first capacitor 112 and the second capacitor 116 can respectively receive the correction signal and the enable signal. The duration of the trigger pulse S2 is such that the first capacitor 112 can be charged to the correction voltage and the second capacitor 116 can be charged to the enable voltage. It should be noted that the duration of the trigger pulse S2 depends on the printing speed. For example, when the printing speed is 600 PPM (Pages per Minute), the duration of the trigger pulse S2 is greater than the duration of the trigger pulse S2 when the printing speed is 1200 PPM.

As shown in FIG. 3, each of the light-emitting units 104 further includes a fifth switch 124. The fifth switch 124 is deployed on the driving path of the OLED 110. A first terminal 124*a* of the fifth switch 124 receives the operating voltage VDD, a second terminal 124*b* of the fifth switch 124 is coupled to the first terminal 118*a* of the second switch 118, and a control terminal 124*c* of the fifth switch 124 receives the scan signal. The fifth switch 124 is a PMOS transistor. Therefore, the actuation pattern of the fifth switch 124 is opposite to the actuation patterns of the third switch 120 and the fourth switch 122. The fifth switch 124 is turned off in response to the trigger pulse S2 of the scan signal, and turned on during a light-emitting cycle (a period during which the control terminal 124*c* of the fifth switch 124 receives the trigger pulse S2) of the OLED 110. This can ensure the driving path of the OLED 110 not to be turned on during the period of the trigger pulse S2.

In some examples, if it can be determined that the threshold voltage of the second switch 118 is within an expected range such that the operation of the second switch 118 can proceed as described above, then the fifth switch 124 may be omitted (in this case, the first terminal 118*a* of the second switch 118 receives the operating voltage VDD).

Figure 4:
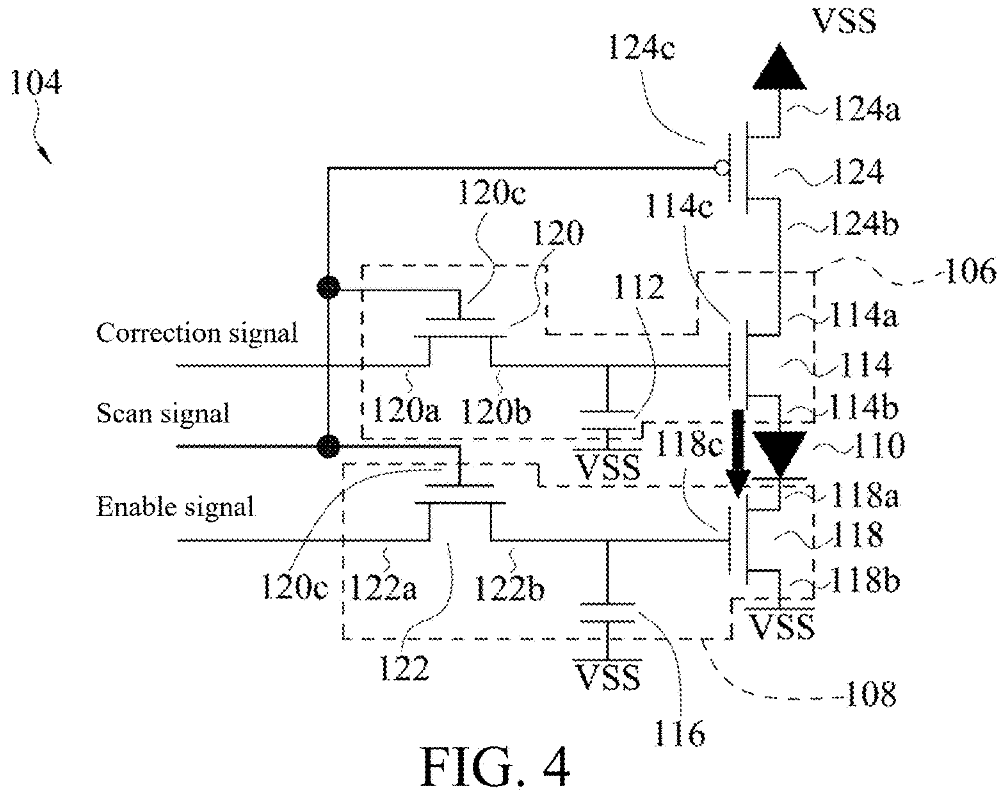
FIG. 4 is a circuit diagram of another embodiment of a light-emitting unit in some examples of the present disclosure.

FIG. 4 is a circuit diagram of another embodiment of the light-emitting units 104 in some examples of the present disclosure. FIG. 4 is different from FIG. 3 in that the first switch 114, the second switch 118 and the OLED 110 are coupled in a different order, but the connection relationship of internal elements between the first driving circuit 106 the second driving circuit 108 and the feed of corresponding signals are still the same. In FIG. 4, the first switch 114, the OLED 110 and the second switch 118 are sequentially coupled along the flow direction of the driving current. Specifically, the first terminal 114*a* of the first switch 114 is coupled to the operating voltage VDD, and the second terminal 114*b* of the first switch 114 is coupled to the anode of the OLED 110. The first terminal 118*a* of the second switch 118 is coupled to the cathode of the OLED 110, and the second terminal 118*b* receives the ground voltage VSS. The operation principle of the elements in FIG. 4 is the same as that in FIG. 3, and will not be repeated here.

Figure 6:
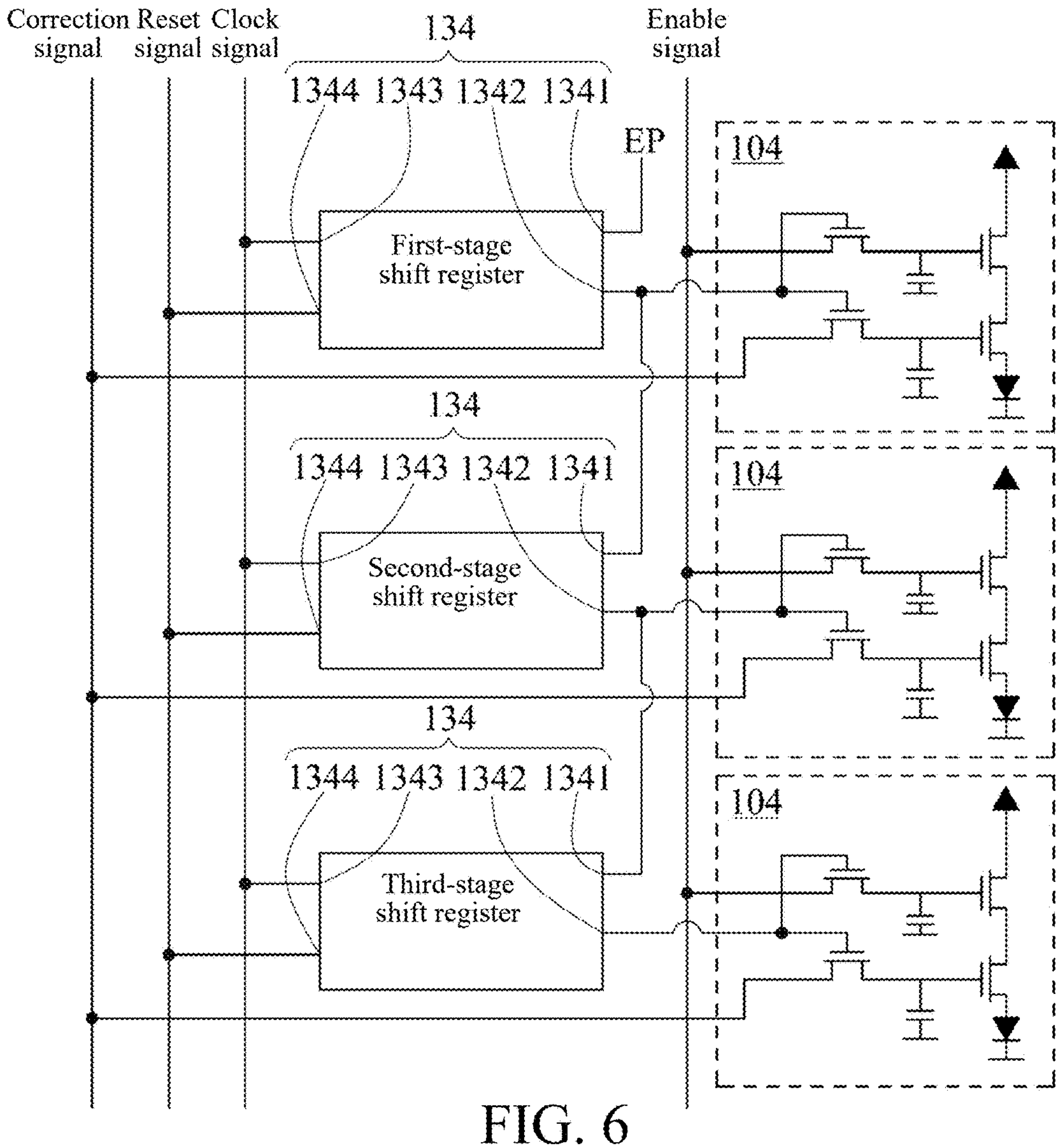
FIG. 6 is another feeder diagram of an OLED print head in some examples of the present disclosure.
Figure 8:
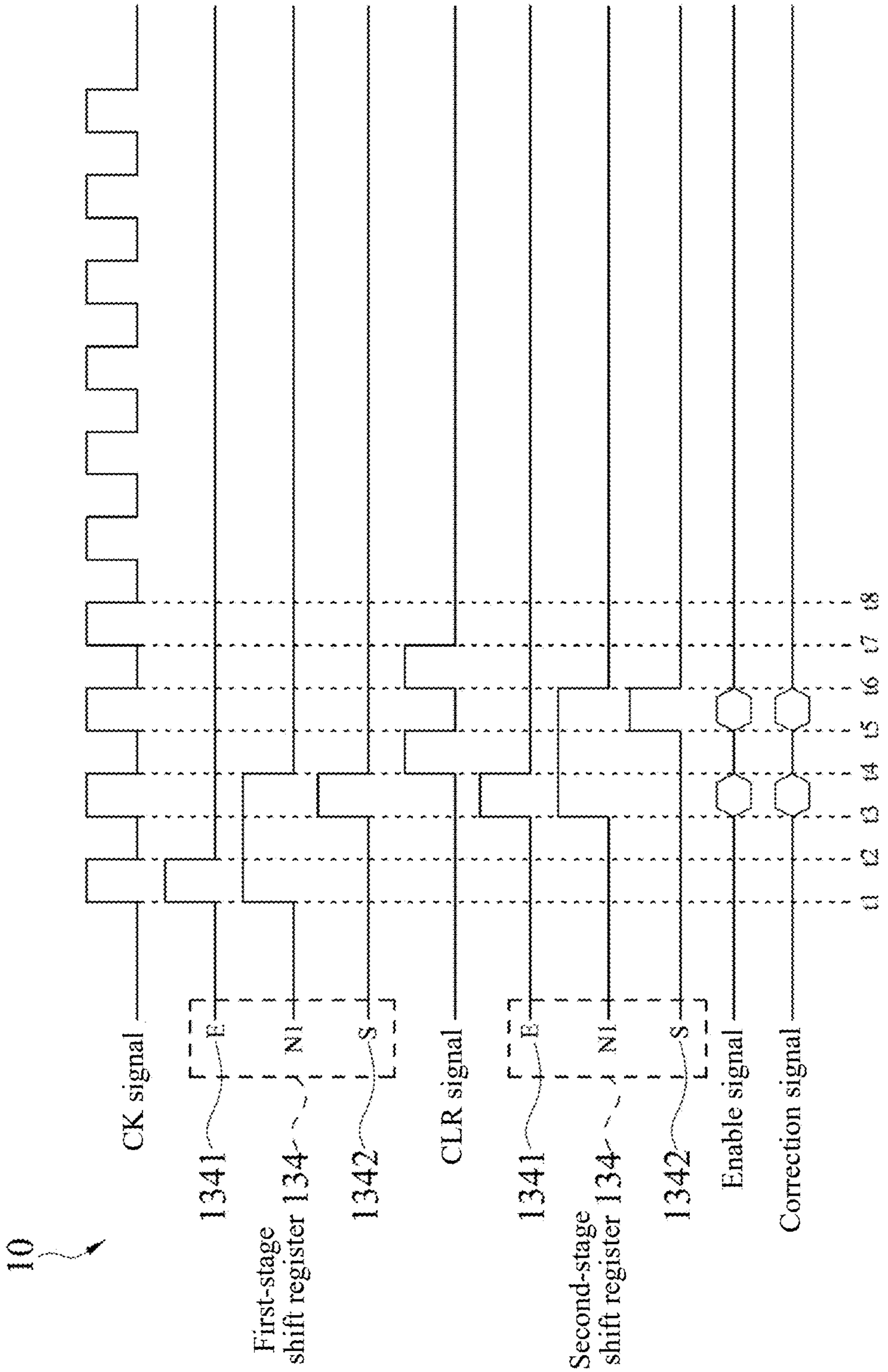
FIG. 8 is a signal timing diagram of an OLED print head in FIG. 6.

Referring to FIG. 6 and FIG. 8, FIG. 6 is a feeder diagram of the OLED print head 10 in some examples of the present disclosure, which shows how to form the scan signal through shift registers 134 and input the scan signal to each of the light-emitting units 104. FIG. 8 is a signal timing diagram of the OLED print head 10 in FIG. 6.

As shown in FIG. 6, in some examples, the scan signal generating circuit 126 includes multiple shift registers 134, and each of the shift registers 134 includes a shift input terminal 1341 and a shift output terminal 1342. The shift registers 134 are sequentially connected in series such that the shift output terminal 1342 of the previous-stage shift register 134 is coupled to the shift input terminal 1341 of the later-stage shift register 134. The shift input terminal 1341 of the first-stage shift register 134 receives an initial signal EP. The shift registers 134 further each include a clock receiving terminal 1343 so as to receive a clock signal and run according to the clock signal. The shift registers 134 shift a state of the shift input terminal 1341 to the shift output terminal 1342 according to a cycle of the clock signal. Therefore, as shown in FIG. 8, the pulse of the initial signal EP successively shifts to the later-stage shift registers 134 with the cycle of the clock signal. The shift output terminals 1342 of the shift registers 134 are respectively coupled to the light-emitting units 104 one-to-one, so that the shifted initial signal EP is transmitted as the trigger pulse S2 of the scan signal sequentially to the light-emitting units 104 respectively through the shift output terminals 1342. The shift registers 134 further each include a clear terminal 1344 so as to reset the shift output terminal 1342 when receiving a reset signal.

Figure 7:
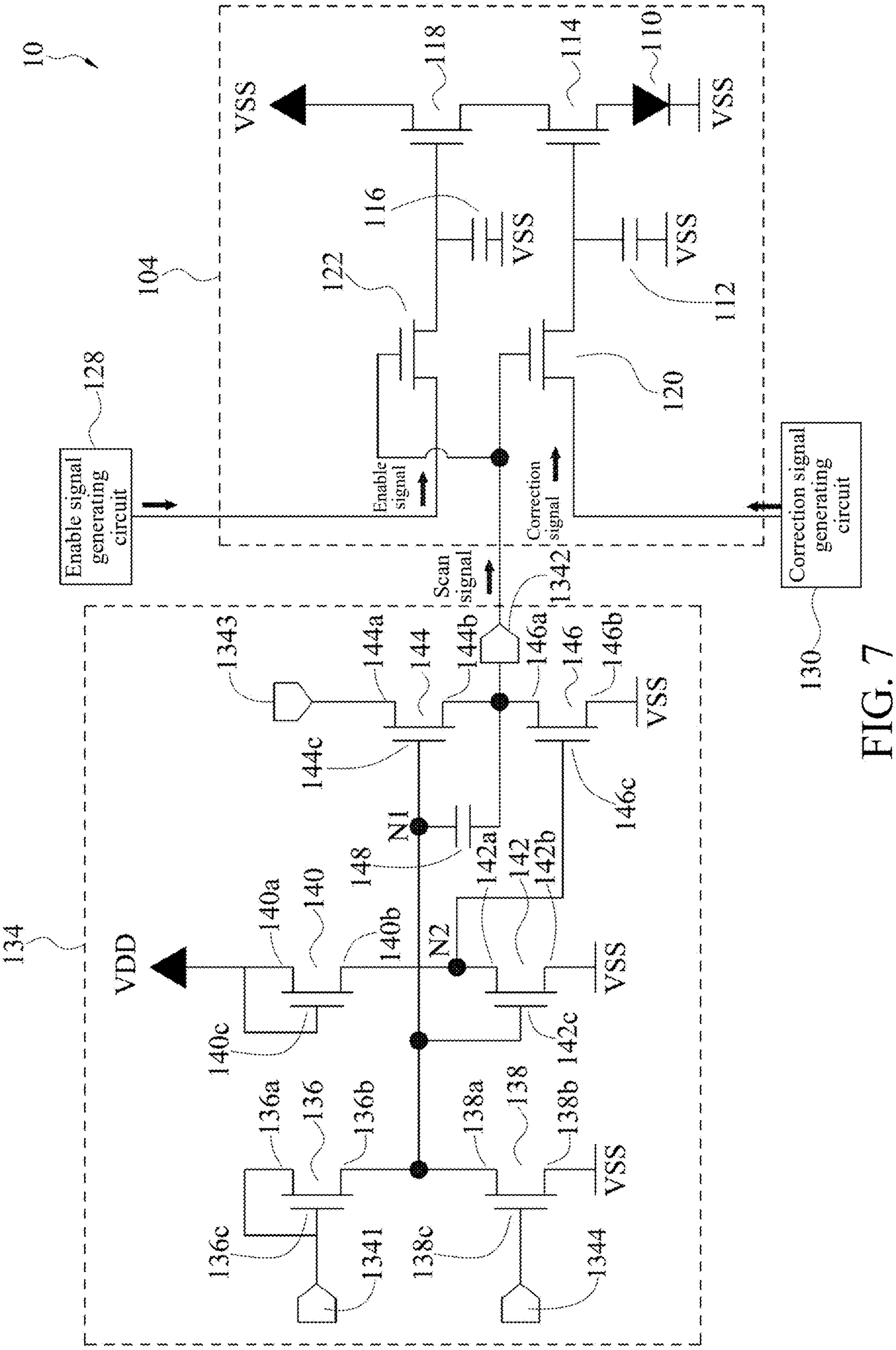
FIG. 7 is a circuit diagram of a shift register and a light-emitting unit in some examples of the present disclosure.

FIG. 7 is a circuit diagram of a shift register 134 and a light-emitting unit 104 in some examples of the present disclosure. As shown in FIG. 7, in some examples, each of the shift registers 134 includes a sixth switch 136, a seventh switch 138, an eighth switch 140, a ninth switch 142, a tenth switch 144, an eleventh switch 146 and a third capacitor 148. The sixth switch 136 has a first terminal 136*a*, a second terminal 136*b* and a control terminal 136*c*. The seventh switch 138 has a first terminal 138*a*, a second terminal 138*b* and a control terminal 138*c*. The eighth switch 140 has a first terminal 140*a*, a second terminal 140*b* and a control terminal 140*c*. The ninth switch 142 has a first terminal 142*a*, a second terminal 142*b* and a control terminal 142*c*. The tenth switch 144 has a first terminal 144*a*, a second terminal 144*b* and a control terminal 144*c*. The eleventh switch 146 has a first terminal 146*a*, a second terminal 146*b* and a control terminal 146*c*. Here, the switches (136, 138, 140, 142, 144, 146) are NMOS transistors, with the first terminals (136*a*, 138*a*, 140*a*, 142*a*, 144*a*, 146*a*) as drains, the second terminals (136*b*, 138*b*, 140*b*, 142*b*, 144*b*, 146*b*) as sources and the control terminals (136*c*, 138*c*, 140*c*, 142*c*, 144*c*, 146*c*) as gates.

The first terminal 136*a* and the control terminal 136*c* of the sixth switch 136 are coupled to form the aforementioned shift input terminal 1341. The second terminal 138*b* of the seventh switch 138 receives the ground voltage VSS, and the control terminal 138*c* of the seventh switch 138 is the aforementioned clear terminal 1344. The first terminal 138*a* of the seventh switch 138 is coupled to the third capacitor 148. The first terminal 140*a* and the control terminal 140*c* of the eighth switch 140 receive the operating voltage VDD, and the second terminal 140*b* is coupled to the first terminal 142*a* of the ninth switch 142. The second terminal 142*b* of the ninth switch 142 receives the ground voltage VSS. The control terminal 142*c* of the ninth switch 142 is coupled to the second terminal 136*b* of the sixth switch 136, and the first terminal 144*a* of the tenth switch 144 is the aforementioned clock receiving terminal 1343 that receives the aforementioned clock signal. The second terminal 144*b* of the tenth switch 144 is coupled to the first terminal 146*a* of the eleventh switch 146, and the aforementioned shift output terminal 1342 is deployed therebetween. The second terminal 146*b* of the eleventh switch 146 receives the ground voltage VSS. The control terminal 144*c* of the tenth switch 144 is coupled to the second terminal 136*b* of the sixth switch 136, and the control terminal 146*c* of the eleventh switch 146 is coupled to a second node N2. The third capacitor 148 is coupled between the control terminal 144*c* and the second terminal 144*b* of the tenth switch 144. That is, one end (a first node N1) of the third capacitor 148 is coupled to the second terminal 136*b* of the sixth switch 136; and the other end of the third capacitor 148 is coupled to the aforementioned shift output terminal 1342.

FIG. 8 is a signal timing diagram of the OLED print head 10 in FIG. 6, which shows the signal relationship between the previous-stage register 134 and the later-stage shift register 134. Here, the signal action timing of the first-stage and second-stage shift registers 134 in FIG. 6 will be described as an example.

At time point t1 (start point of the first-stage shift register 134): in the first-stage shift register 134, the clock signal received by the clock receiving terminal 1343 is at a high potential, the initial signal EP received by the shift input terminal 1341 is at a high potential, the reset signal received by the clear terminal 1344 is at a low potential, the sixth switch 136, the eighth switch 140, the ninth switch 142 and the tenth switch 144 are turned on, and the seventh switch 138 the eleventh switch 146 are turned off. In this case, the first node N1 is at a high potential, and the shift output terminal 1342 of the first-stage shift register 134 is at a low potential.

At time point t3 (scan generation point of the first-stage shift register 134): in the first-stage shift register 134, the clock signal received by the clock receiving terminal 1343 changes from the low potential to a high potential, and the shift output terminal 1342 of the first-stage shift register 134 is at a high potential, i.e., the trigger pulse S2 of the scan signal is generated. The shift input terminal 1341 of the second-stage shift register 134 is coupled to the shift output terminal 1342 of the second-stage shift register 134, and thus, is also at a high potential (at this time, the second-stage shift register 134 gets into the start point). When the trigger pulse S2 of the scan signal is at a high potential, the control terminal 122*c* turns on the fourth switch 122 in response to the scan signal such that the enable signal is inputted to the light-emitting unit 104, and the control terminal 120*c* turns on the third switch 120 in response to the scan signal such that the correction signal is inputted to the light-emitting unit 104. During the duration of time point t3 (between time point t3 and time point t4), the control terminal 118*c* turns on the second switch 118 in response to the enable signal, the control terminal 114*c* turns on the first switch 114 in response to the enable signal, and the driving path obtains the driving current such that the OLED 110 emits light.

At time point t4 (scan end point of the first-stage shift register 134): in the shift registers 134, the clock signal received by the clock receiving terminal 1343 changes to a low potential, and the reset signal received by the clear terminal 1344 changes to a high potential, so that the shift output terminals 1342 of all the shift registers 134 are reset to a low potential. In the first-stage shift register 134, the sixth switch 136, the ninth switch 142 and the tenth switch 144 are turned off, the seventh switch 138, the eighth switch 140 and the eleventh switch 146 are turned on, and the first node N1 is at a low potential. The shift output terminal 1342 of the first-stage shift register 134 is at a low potential, and the scan signal ends.

At time point t5: the second-stage shift register 134 gets into the scan generation point, and the third-stage shift register 134 gets into the start point.

At time point t6: the reset signal received by the clear terminal 1344 changes to a high potential, such that the shift output terminals 1342 of all the shift registers 134 are reset to a low potential. The scan of the second-stage shift register 134 ends.

At time point t7: the third-stage shift register 134 gets into the scan generation point.

Therefore, the number of the shift registers 134 may be increased according to the number of the light-emitting units 104, and each of the shift registers 134 can sequentially generate the trigger pulse S2 of the scan signal according to the above actuation.

Figure 9:
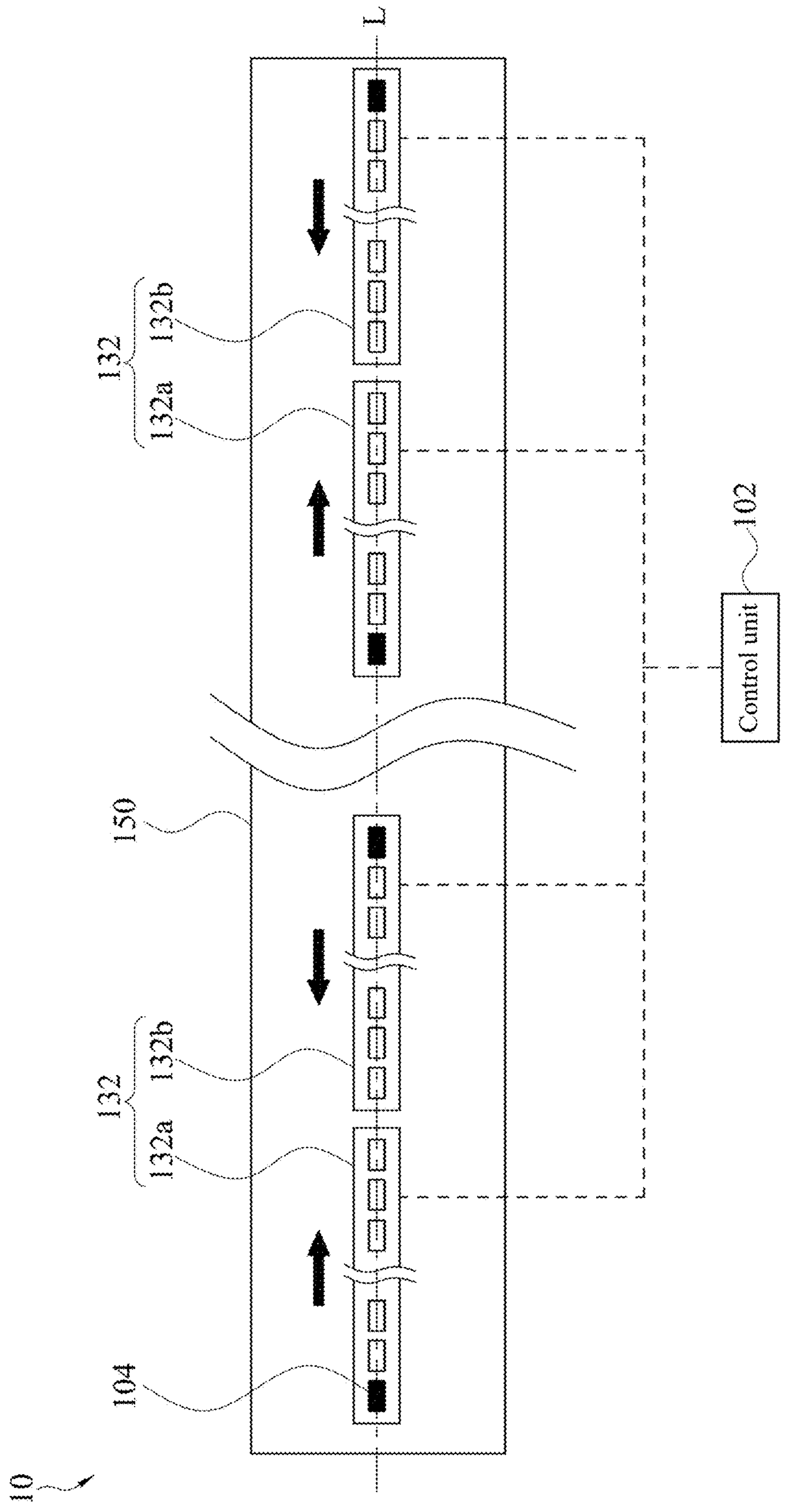
FIG. 9 is a schematic planar view of an OLED print head in some examples of the present disclosure.

Referring to FIG. 9, FIG. 9 is a schematic planar view of the OLED print head 10 in some examples of the present disclosure. In some examples, the light-emitting units 104 are configured to be deployed on a substrate 150 and distributed as a line. The light-emitting units 104 are divided into multiple groups 132, and the groups 132 include multiple first groups 132*a* and multiple second groups 132*b*. Each of the groups 132 is deployed in one section of an axial line L of the substrate 150. The groups (132*a*, 132*b*) of light-emitting units 104 are staggered and respectively lit according to a first light emitting sequence (from left to right as shown by the arrow direction in FIG. 9) and a second light emitting sequence (from right to left as shown by the arrow direction in FIG. 9) opposite to the first light emitting sequence. In other words, the first groups 132*a* and the second groups 132*b* are respectively staggered (for example, the first groups 132*a* have odd ordinal numbers, and the second groups 132*b* have even ordinal numbers, or vice versa), the first groups 132*a* of light-emitting units 104 are sequentially lit according to the first light emitting sequence, and the second groups 132*b* of light-emitting units 104 are sequentially lit according to the second light emitting sequence. Therefore, compared with a method of lighting all the light-emitting units in a same direction, the method of the present disclosure makes segment differences between print lines less visible.

In some examples, the light-emitting units 104 are made by a conductive thin film technology. That is, the OLED 110, the first driving circuit 106 and the second driving circuit 108 are made of transparent conductive films such as indium tin oxide (ITO) and indium zinc oxide (IZO) and packaged on the substrate 150 (i.e., a glass substrate). Therefore, the multiple light-emitting units 104 can be formed on the substrate 150 according to a predetermined layout without wafer dicing or die bonding. Moreover, the conductive thin films may also form wires, which can reduce the step of wire bonding. In some examples, the shift registers 134 are made by a conductive thin film technology and packaged on the same substrate 150 as the light-emitting units 104. The transistors are thin film transistors (TFTs). The OLED 110 may be AMOLEDs, so that the OLED 110 has the advantages of small size, self-luminescence and high response speed.

In some examples, the control unit 102 is a microprocessor, a digital signal processor (DSP), an application specific integrated circuit (ASIC) or another control circuit that can output the aforementioned timing signals.

Based on the above, according to the OLED print head 10 in some examples of the present disclosure, the light-emitting unit 104 made of the transistors and the multiple OLEDs 110 and the driving circuits thereof by a conductive thin film technology can be directly manufactured on a substrate 150, which can reduce the manufacturing steps. In addition, the first capacitor 112 of the light-emitting unit 104 stores the correction voltage corresponding to the correction signal, and will not discharge the voltage to a low potential (i.e., the change in discharge of the first capacitor 112 is limited), which can shorten the light-emitting response time of the light-emitting unit 104 (in response to the correction signal with a short cycle time, the light-emitting unit 104 can be continuously lit and extinguished quickly) and prevent severe fluctuations in charge/discharge voltage of the capacitor from damaging the element, thereby prolonging the service life and shortening the response time of the OLED 110.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. An OLED print head, comprising:

a control unit, configured to output a scan signal, an enable signal and a correction signal; and a plurality of light-emitting units, coupled to the control unit, each of the light-emitting units comprising:

a first driving circuit, comprising a first capacitor and a first switch, and configured to store a correction voltage corresponding to the correction signal in the first capacitor in response to a trigger pulse of the scan signal, the first switch being controlled by the correction voltage;

a second driving circuit, comprising a second capacitor and a second switch, and configured to store an enable voltage corresponding to the enable signal in the second capacitor in response to the trigger pulse of the scan signal, the second switch being controlled by the enable voltage; and an OLED, coupled to the first switch and the second switch, the first switch and the second switch being deployed on a driving path of the OLED, an upstream end of the driving path having an operating voltage, and when both the first switch and the second switch are turned on, the OLED obtaining a driving current related to the correction voltage through the driving path.

2. The OLED print head according to claim 1, wherein the first driving circuit further comprises a third switch, the first switch and the third switch respectively comprising a first terminal, a second terminal and a control terminal; the first terminal of the third switch receiving the correction signal, the second terminal of the third switch being coupled to the first capacitor, and the control terminal of the third switch receiving the scan signal so as to turn on the first terminal of the third switch and the second terminal of the third switch in response to the trigger pulse of the scan signal, such that the first capacitor receives the correction signal through the third switch and is charged to the correction voltage; and the control terminal of the first switch being coupled to the first capacitor so as to turn on the first terminal of the first switch and the second terminal of the first switch under the control of the correction voltage.

3. The OLED print head according to claim 1, wherein the second driving circuit further comprises a fourth switch, the second switch and the fourth switch respectively comprising a first terminal, a second terminal and a control terminal; the first terminal of the fourth switch receiving the enable signal, the second terminal of the fourth switch being coupled to the second capacitor, and the control terminal of the fourth switch receiving the scan signal so as to turn on the first terminal of the fourth switch and the second terminal of the fourth switch in response to the trigger pulse of the scan signal, such that the second capacitor receives the enable signal through the fourth switch and is charged to the enable voltage; and the control terminal of the second switch being coupled to the second capacitor so as to turn on or off the first terminal of the second switch and the second terminal of the second switch under the control of the enable voltage.

4. The OLED print head according to claim 1, wherein the first driving circuit further comprises a third switch, and the second driving circuit further comprises a fourth switch, the third switch and the fourth switch respectively comprising a first terminal, a second terminal and a control terminal; the first terminal of the third switch receiving the correction signal, and the second terminal of the third switch being coupled to the first capacitor; the first terminal of the fourth switch receiving the enable signal, and the second terminal of the fourth switch being coupled to the second capacitor; the control terminal of the third switch and the control terminal of the fourth switch being coupled to each other to receive the scan signal; and the third switch and the fourth switch simultaneously turning on the respective first terminal and the second terminal in response to the trigger pulse of the scan signal.

5. The OLED print head according to claim 1, wherein the second switch, the first switch and the OLED are sequentially coupled along a flow direction of the driving current.

6. The OLED print head according to claim 1, wherein the first switch, the OLED and the second switch are sequentially coupled and a flow direction of the driving current.

7. The OLED print head according to claim 1, wherein each of the light-emitting units further comprises:

a fifth switch, deployed on the driving path of the OLED, and receiving the scan signal so as to be turned off in response to the trigger pulse of the scan signal and turned on during a light-emitting cycle of the OLED.

8. The OLED print head according to claim 1, wherein the control unit comprises:

a scan signal generating circuit, comprising a plurality of scan signal output terminals and configured to output the scan signal through the scan signal output terminals;

an enable signal generating circuit, comprising a plurality of enable signal output terminals and configured to output the enable signal through the enable signal output terminals; and a correction signal generating circuit, comprising a plurality of correction signal output terminals and configured to output the correction signal through the correction signal output terminals, wherein the light-emitting units are divided into a plurality of groups, and each of the scan signal output terminals is coupled to the light-emitting units with a same ordinal number as the scan signal output terminal in the groups; the enable signal output terminals are respectively coupled to the groups one-to-one, and each of the enable signal output terminals is coupled to all the light-emitting units in the same group; and the correction signal output terminals are respectively coupled to the groups one-to-one, and each of the correction signal output terminals is coupled to all the light-emitting units in the same group.

9. The OLED print head according to claim 8, wherein the scan signal generating circuit comprises a plurality of shift registers, each of the shift registers comprising a shift input terminal and a shift output terminal, and the shift registers being sequentially connected in series such that the output terminal of the previous-stage shift register is coupled to the shift input terminal of the later-stage shift register, wherein the output terminals are respectively coupled to the corresponding light-emitting units one-to-one, such that the trigger pulse is respectively transmitted to the light-emitting units sequentially through the output terminals.

10. The OLED print head according to claim 1, wherein the light-emitting units are configured to be distributed as a line; the light-emitting units are divided into a plurality of groups, and each of the groups is deployed in one section of the line; and the groups of light-emitting units are staggered and respectively lit according to a first light emitting sequence and a second light emitting sequence, wherein the first light emitting sequence is opposite to the second light emitting sequence.

* * * * *